(12) United States Patent
Ward

(10) Patent No.: US 11,845,312 B2
(45) Date of Patent: Dec. 19, 2023

(54) TRAILER CHAIN SAFETY DEVICE

(71) Applicant: Robin N. Ward, Parma, ID (US)

(72) Inventor: Robin N. Ward, Parma, ID (US)

( * ) Notice: Subject to any disclaimer, the term of this patent is extended or adjusted under 35 U.S.C. 154(b) by 181 days.

(21) Appl. No.: 17/133,864

(22) Filed: Dec. 24, 2020

(65) Prior Publication Data

US 2022/0203785 A1 Jun. 30, 2022

(51) Int. Cl.
*B60D 1/28* (2006.01)
(52) U.S. Cl.
CPC ...................... *B60D 1/28* (2013.01)
(58) Field of Classification Search
CPC .......... B60D 1/18; B60D 1/182; B60D 1/185; B60D 1/187; B60D 1/28; B60D 1/38; B60D 1/50; B60D 1/52; B60D 1/58; B60D 1/583; Y10T 24/312
See application file for complete search history.

(56) References Cited

U.S. PATENT DOCUMENTS

| | | | |
|---|---|---|---|
| 2,110,226 A | 3/1938 | Hill | |
| 2,452,752 A | 11/1948 | Hartranft | |
| 2,585,054 A * | 2/1952 | Stachura | H02G 3/0481 174/DIG. 11 |
| 3,250,527 A * | 5/1966 | Ramsey | B60D 1/182 267/70 |
| 3,264,821 A | 8/1966 | Rosenberg | |
| 3,265,407 A | 8/1966 | Paddock | |
| 3,447,794 A | 6/1969 | Sudyk | |
| 3,574,996 A | 4/1971 | Loos | |
| 3,775,969 A | 12/1973 | Vasterling | |
| 4,180,281 A | 12/1979 | Tertinek | |
| 4,489,548 A * | 12/1984 | Derman | B63B 21/00 267/74 |
| 4,716,989 A * | 1/1988 | Coleman | H01B 7/0054 187/404 |
| 4,724,929 A * | 2/1988 | Coleman | H01B 7/0823 187/414 |
| 4,759,395 A * | 7/1988 | Tsukamoto | B60C 25/025 157/1.1 |
| 4,860,408 A * | 8/1989 | Johnson | D07B 5/005 24/122.3 |
| 5,039,272 A * | 8/1991 | Holmes | B60P 3/125 280/402 |

(Continued)

FOREIGN PATENT DOCUMENTS

EP 2955146 A1 12/2015

*Primary Examiner* — Tony H Winner
*Assistant Examiner* — Maurice L Williams
(74) *Attorney, Agent, or Firm* — Scott Swanson; Shaver & Swanson, LLP

(57) ABSTRACT

A safety device for use with a chain extending between a trailer and a tow vehicle. The device has a central sleeve that houses the chain. Two side sleeves extend parallel to the central sleeve and house an elastic cord. The elastic cord provides tension to the sleeve, allowing the chain to group or bunch up without tension. The allows a user to avoid having to manipulate the length of the chain in order to avoid chain drag from the chains being too long or chain bind from the chains being too short when the vehicle attempts to turn while towing the trailer. Typically trailers have a pair of safety chains extending from the trailer to the vehicle, thus two of the devices are preferably utilized.

7 Claims, 4 Drawing Sheets

(56) References Cited

U.S. PATENT DOCUMENTS

| | | | | |
|---|---|---|---|---|
| 5,112,074 | A | * | 5/1992 | Smith .................... B60D 1/50 280/483 |
| 5,362,084 | A | * | 11/1994 | Edwards ................ B60D 1/28 280/480 |
| 5,732,967 | A | * | 3/1998 | Behling .................. B60D 1/60 280/480 |
| 6,048,145 | A | * | 4/2000 | Pedersen ............... B60P 7/0861 410/97 |
| 6,050,587 | A | * | 4/2000 | Panhausen ............. B60D 1/18 280/480 |
| 6,241,296 | B1 | * | 6/2001 | Crabtree ................ B60D 1/182 280/480 |
| 6,581,952 | B1 | * | 6/2003 | MacKarvich ........... B60D 1/28 280/507 |
| 6,752,412 | B2 | * | 6/2004 | Saul ....................... B60D 1/18 280/480 |
| 6,805,471 | B2 | | 10/2004 | Strelnieks |
| 6,971,661 | B1 | * | 12/2005 | MacKarvich ........... B60D 1/38 280/480.1 |
| 7,267,354 | B2 | * | 9/2007 | Cunningham .......... B60D 1/38 280/495 |
| 7,461,501 | B1 | | 12/2008 | Bajema |
| 8,235,410 | B2 | * | 8/2012 | Weber .................. B60D 1/1675 280/495 |
| 9,125,463 | B2 | * | 9/2015 | Tuchman ................ B60D 1/18 |
| 9,233,585 | B1 | * | 1/2016 | Haynes .................... B60D 1/18 |
| 9,849,740 | B2 | * | 12/2017 | Sparkes ................ B60D 1/182 |
| 10,875,369 | B2 | * | 12/2020 | Gabriel .................. B60D 1/44 |
| 2013/0142997 | A1 | * | 6/2013 | Hofmann ............... B29C 48/08 428/156 |
| 2015/0306930 | A1 | | 10/2015 | Olson |
| 2017/0227090 | A1 | * | 8/2017 | Glissman ............... H02G 11/00 |
| 2018/0257444 | A1 | | 9/2018 | Hack |
| 2020/0398621 | A1 | * | 12/2020 | Landis .................... B60D 1/52 |
| 2021/0215230 | A1 | * | 7/2021 | Howard ................ F16G 11/146 |

* cited by examiner

TRAILER CHAIN SAFETY DEVICE

TECHNICAL FIELD

The presently disclosed technology relates to safety devices for towing trailers with towing vehicles. More particularly, the present invention is a protective device for providing tension.

BACKGROUND

Typically in a towing vehicle, such as a pick up or SUV, has a ball configured for attachment to a trailer via a trailer hitch. This is typically called a ball hitch. The ball is either attached directly to the towing vehicle bumper or positioned on a receiver hitch that is placed within a receiver at the rear of the vehicle. The trailer typically utilizes a ball receiver that is configured to be positioned onto the ball to couple the trailer to the trailer hitch. The trailer typically has a pair of safety chains extending between the trailer and the towing vehicle in the event the trailer ball and trailer coupler become detached. This prevents the trailer from rolling away from the tow vehicle and serve as a safety mechanism in the event of hitch failure. Typically the safety chains are integral with the tongue of the trailer. Typically the towing vehicle has a pair of openings positioned on or at the hitch to which a clip or hook of the chains is placed in through. Typically the safety chains have an end that is affixed to the trailer and a second end having a releasable connection to the openings of the towing vehicle.

Because a wide variety of towing vehicles can be utilized with a single trailer, the length of the safety chains typically need to be made to accommodate these verifying lengths. This can lead to the safety chains being too long for given circumstances and potentially dragging on the ground as the trailer is towed. Dragging of chains is a fairly common problem that can lead to sparks and create wildfires. Dragging the chains can also cause premature wear on the chains and lead to safety issues. One remedy of over length trailer chains is to twist or rotate the chains before attaching the chains to the tow vehicle. However, when a individual pulling a trailer twists chains in excess to eliminate chain droop, this can cause the chain to become too short, thus causing inadvertent trailer to vehicle binding while turning. This can pose damage to the vehicle, safety chain as well as the trailer. What is needed is an improved mechanism for shortening and lengthening the chains that does not require the user to remember to alter the length of the chains.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a safety chain apparatus for connecting a trailer to a towing vehicle. The apparatus has a chain having a continuous length of chain links. The chain having a first end connected to a frame of the trailer and a second end configured for connection to the towing vehicle, typically by a hook or clip.

A central elongate sleeve is positioned on the continuous length of chain links. The central elongate sleeve is tensioned by elastic cord or other material positioned in elongate sleeves positioned on opposing sides of the central elongate sleeve and having voids that extend parallel to the void of the central elongate sleeve. The central elongate sleeve is configured to surround the continuous length of chain links such that it stores the length of chain links and allows them to bunch together without drooping. The central elongate sleeve extends preferably from a first sleeve end proximate to the first end of the chain to the second sleeve end proximate to the second end of the chain.

The sleeves positioned on opposing sides of the central elongate sleeve include a first elongate side sleeve and a second elongate side sleeve. The elongate side sleeves form separate sleeves and each holds a section of elongate elastic cord. Each sleeve is attached to the central elongate sleeve at opposing positions on the central elongate sleeve. Alternatively the elongate side sleeves and central elongate sleeve can be formed from a single sleeve, with stitching dividing the sleeve into the three different sleeve.

A first section of elongate elastic cord extends through the first elongate side sleeve and a second section of elongate elastic cord extending through the second elongate side sleeve. The sections of elongate elastic cord can be sections of an endless loop of elastic cord that provides support to the chain.

Each section of elongate elastic cord is functionally attached at opposing ends to the chain to provide elastic support to the chain. This allows the chain to bunch in the central elongate sleeve, and to extend and contract when the tow vehicle and trailer turn. If the trailer inadvertently detaches from the tow vehicle, the elastic cord can be configured to break with the chain stopping the trailer from rolling away from the vehicle. Preferably the two sections of elongate elastic cord are part of a single elastic cord that is woven through the first side sleeve, through a link of the chain at one end of the chain, back through the second side sleeve, and through a link at the second end of the chain. The ends of the elastic cord can then be attached by a connector. Preferably the sleeve is adjustable in length.

The device can be provided as a kit for upgrading a pre-existing chain connection between a tow vehicle and a trailer. The preexisting chain connection has a chain having a series of continuous links extending between the trailer and the tow vehicle. The kit is provided with a sleeve. The sleeve having a central elongate sleeve configured to be positioned on the continuous length of chain links. The central elongate sleeve is configured to surround the continuous length of chain links. When installed, the central elongate sleeve extends from a first sleeve end proximate to the first end of the chain to a second sleeve end proximate to the second end of the chain.

A first elongate side sleeve and a second elongate side sleeve are attached to the central elongate sleeve at opposing positions on the central elongate sleeve. Each of these side sleeves is configured to hold a section of elastic cord. The first elongate side sleeve and the second elongate side sleeve extend parallel to the central elongate side sleeve.

The kit includes an elongate section of elastic cord having a first end and a second end. A connector is provided and configured to connect the first end and second end of the elastic cord to form an endless loop. The kit is configured to be attached to the chain by placing the chain through the central elongate sleeve, routing the elongate section of elastic cord through a first elongate side sleeve, through a link of the chain proximate a first end of the chain, through the second elongate side sleeve, through a link of the chain proximate a second end of the chain, and attaching the first end of the elongate section of elastic cord to the second end of the elongate cord with the connector.

Preferably the kit includes a second sleeve, a second elongate section of elastic cord, and a second connector so that Utilizing the elastic cord in association with the opposing longitudinal sleeves serves to protect the elastic cord from the environment, including from excessive UV light exposure from the sun, which typically serves to degrade elastic cords utilized in towing. The chain sleeve when tensioned properly, bunches the chain within the sleeve, but allows the chain sleeve to stretch thus allowing the chain to extend to the length required for the turning radius.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature

DETAILED DESCRIPTION OF THE PREFERRED EMBODIMENTS

Figure 1:
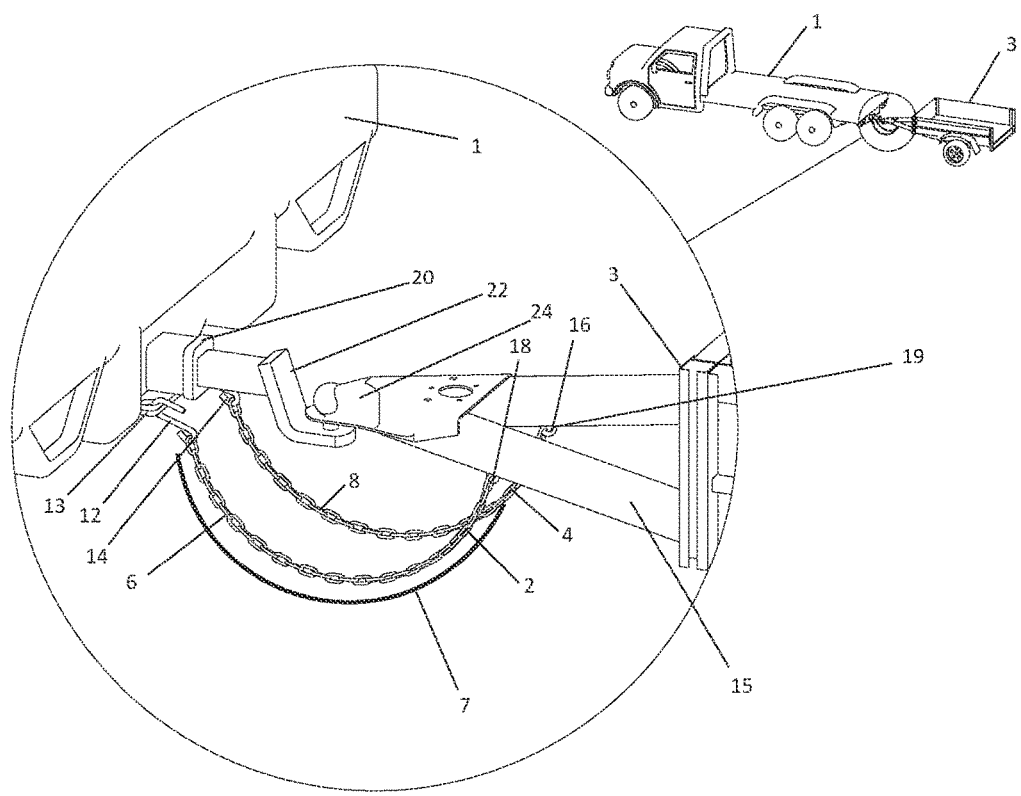
FIG. 1 is a prior art view of a pair of chains connecting a trailer hitch and a receiver.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

FIG. 1 illustrates a prior art view of a towing vehicle coupled to a trailer. A tow hitch 22 is positioned within a receiver hitch 20 affixed to the towing vehicle 1. The towing hitch 22 is affixed to the trailer 3 via the trailer coupler 24. The tow hitch 22 has a ball (not shown) that is positioned within the sleeve of the trailer coupler 24. A pair of safety chains 6, 8 stretches between the tongue 15 of the trailer and the receiver hitch 20 of the towing vehicle the receiver hitch has a pair of openings 13 to allow for a hook end 12, 14 of each safety chain to be positioned to be attached to a vehicle. The opposite end 16, 18 of each safety chain is connected to an eyelet 19, 21 attached to the underside of the trailer tongue. In the event of decoupling in the trailer coupler from the ball, the safety chains serve to prevent the trailer from uncontrollably rolling away from the tow vehicle. With the safety chains properly installed, the trailer will roll away from the tow vehicle causing the slack to be taken out of the chains along line 7, preventing the trailer from rolling further away from the tow vehicle.

Figure 2:
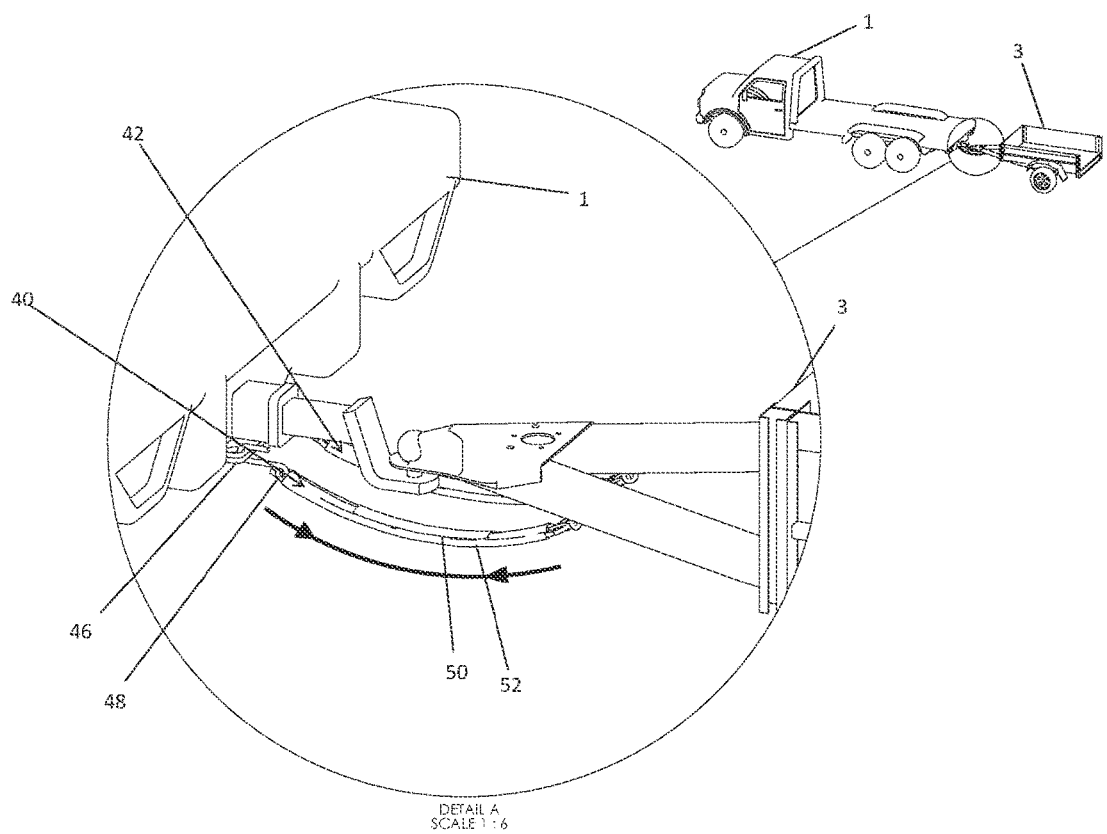
FIG. 2 is a perspective view of a trailer hitch connected to a receiver with an embodiment of the invention positioned between the receiver and the hitch.
Figure 3:
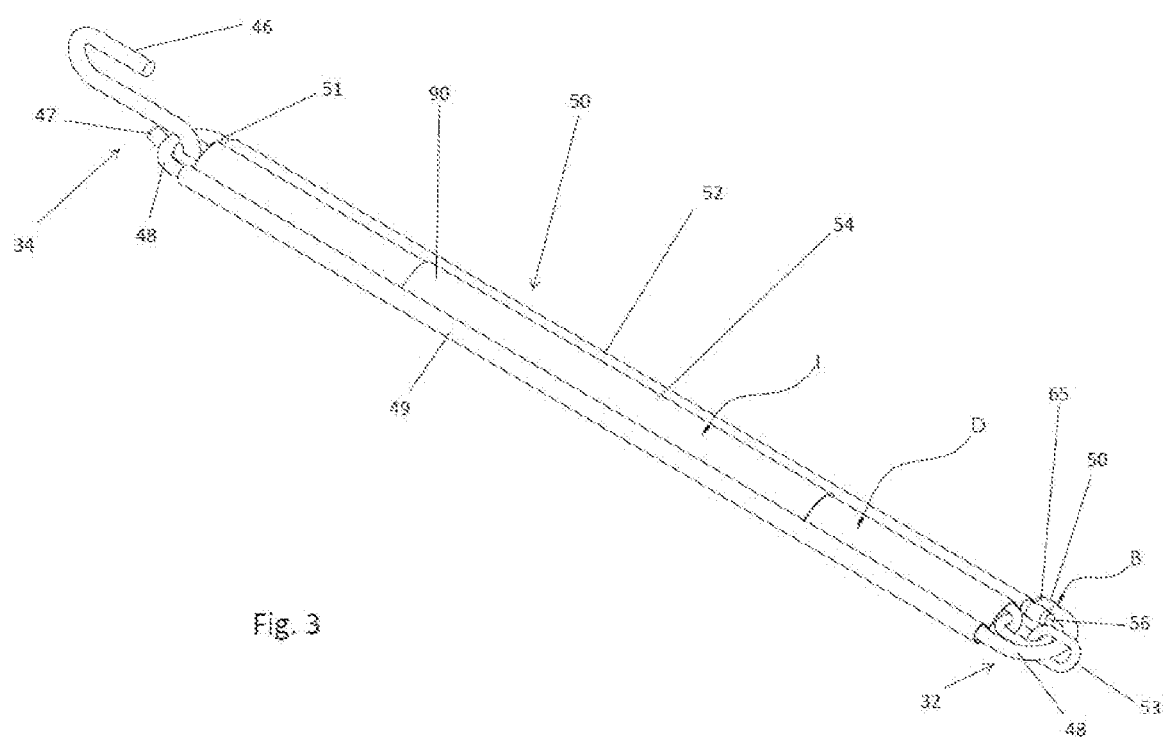
FIG. 3 is a perspective view of an embodiment of the invention.

FIG. 2 illustrates a cut away magnified view of the connection between a tow vehicle 1 and trailer 3 utilizing a safety chain sleeve of the current invention. FIG. 3 illustrates a perspective view of a safety chain and sleeve of the current invention. Each safety chain and sleeve has a hook each 46 connected to a length of chain 70. A sleeve 40 extends around the chain and has two side sleeves 49, 52 extending longitudinally along the length of the main pocket of the sleeve 54. An elastic cord 48 extends from a first end 56 through the first longitudinal sleeve 52 through an eye 47 of the hook and returns via a second longitudinal sleeve 49 toward a second end 32 of the safety chain and sleeve. The second end 32 of the sleeve has a chain link 53 configured for connecting to an eyelet or other loop of a trailer tongue. An elastic cord 48 extends through the chain at the second end 32 of the safety chain and sleeve. A connector 50 connects the first end of the cord and the second end of the cord to form and endless loop of the elastic cord that extends around the chain. A central sleeve 54 is positioned around the chain. In a preferred embodiment the sleeve is longitudinally adjustable 90 by moving sections I and D toward or away from one another. The central sleeve allows for the housing of slack in the chain to allow for extension and return of the chain. The elastic cord stretches in the event the trailer is disconnected from the vehicle. The elastic cord further serves to maintain tension in the chain to prevent the safety chain from dragging or otherwise needing to be adjusted in length.

In a preferred embodiment the sleeve and cord are sold or provided in a kit having an elastic cord having a length, and an end connector. A user then modifies the length of the sleeve for use with a chain of a given length. The elastic cord can then be cut in order to be provided for a shorter length. The chain is then placed through the central sleeve, and the elastic cord is placed through a first longitudinal side sleeve 52 through a length of the chain or eyelet of the chain or hook connecting the chain to a tow vehicle receiver and placed through the second longitudinal channel 49 and returned back to the second end of the chain. The elastic cord is then placed through a chain link 48 and attached to the first end of the elastic cord 56 by a connector 50.

Figure 4:
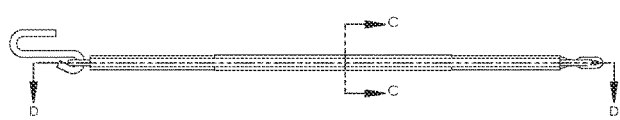
FIG. 4 is a perspective view of the embodiment of the invention.
Figure 5:
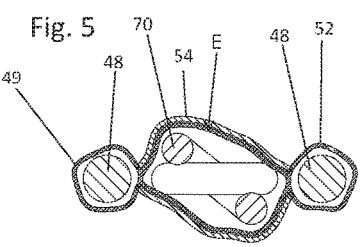
FIG. 5 is a cross section along line CC of FIG. 4.

FIG. 4 illustrates a preferred embodiment of a safety chain and a safety chain sleeve with illustrated section lines C-C and longitudinal cross section line D-D. FIG. 5 illustrates a cross section along line C-C of FIG. 4. The two opposing longitudinal channels 52, 49 are shown with the elastic cord 48 positioned within the sleeves. The safety chain 70 is positioned within the central channel 54. The central sleeve 54 and side longitudinal sleeves form separate, distinct sleeves. The side longitudinal sleeves 52, 49 are positioned on opposing sides of the central sleeve 54.

Figure 6:
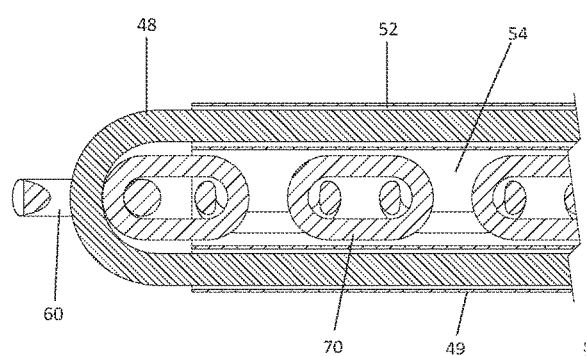
FIG. 6 is a cross section along line D-D of FIG. 4.
Figure 6:
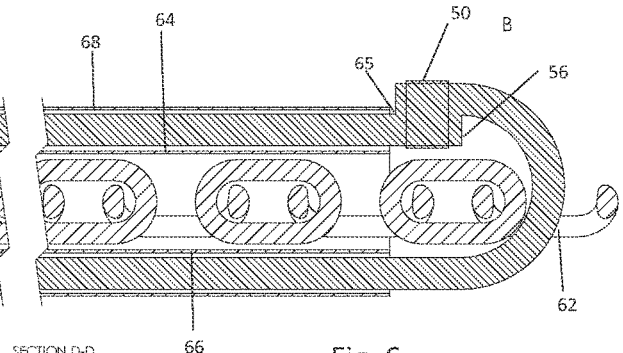

FIG. 6 illustrates a longitudinal cross section along line D-D of FIG. 4. FIG. 6 illustrates the elastic cord 48 extending from a first end 56 through the first longitudinal side channel 52 through the first end of the chain 60, retuning through the second longitudinal side sleeve 49 and returning through the second end of the chain 62 and reconnecting at the second end of the elongate cord 65 to the first end 56 via connector 50.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A safety chain apparatus for connecting a trailer to a towing vehicle, the apparatus comprising:
   a chain comprising a continuous length of chain links, said chain comprising a first end connected to a frame of the trailer, said chain comprising a second end configured for connection to said towing vehicle,
   a central elongate sleeve positioned on said continuous length of chain links, wherein said elongate sleeve is configured to surround said continuous length of chain links, wherein said central elongate sleeve extends from a first sleeve end proximate to said first end of said chain to a second sleeve end proximate to said second end of said chain;
   a first elongate side sleeve and a second elongate side sleeve attached to said central elongate sleeve at opposing positions on said central elongate sleeve, wherein said first elongate side sleeve and said second elongate side sleeve extend parallel to said central elongate sleeve;
   a first section of elongate elastic cord extending through said first elongate side sleeve;
   a second section of elongate elastic cord extending through said second elongate side sleeve;
   wherein a first end of said first elongate elastic cord and a first end of said second section of elongate elastic cord are functionally attached to said first end of said chain, wherein a second end of said first elongate elastic cord and a second end of said second elongate elastic cord are functionally attached to said second end of said chain such that when said chain is connected to said tow vehicle and said trailer said first section of elongate elastic cord and said second section of elongate elastic cord provide tension to said chain such that chain within said central elongate sleeve is not in tension.

2. The safety chain apparatus of claim 1, wherein said first section of elongate elastic cord and said second section of elongate elastic cord are sections of an endless loop of elastic cord.

3. The safety chain apparatus of claim 2, wherein said endless loop is formed by a length of elastic cord attached by a connector at each end of said length of elastic cord to form an endless loop.

4. The safety chain apparatus of claim 2, wherein said endless loop extends through a first end link in said chain proximate said first end of said chain and through a second end link proximate said second end of said chain.

5. The safety chain apparatus of claim 1, wherein said central elongate sleeve is adjustable in length.

6. A kit for upgrading a chain connection between a tow vehicle and a trailer, said chain connection comprising a chain having a series of continuous links extending between the trailer and the tow vehicle, the kit comprising:
   a sleeve, said sleeve comprising:
   a central elongate sleeve configured to be positioned on said continuous length of chain links, wherein said elongate sleeve is configured to surround said continuous length of chain links, wherein said central elongate sleeve extends from a first sleeve end proximate to said first end of said chain to a second sleeve end proximate to said second end of said chain;
   a first elongate side sleeve and a second elongate side sleeve attached to said central elongate sleeve at opposing positions on said central elongate sleeve, wherein said first elongate side sleeve and said second elongate side sleeve extend parallel to said central elongate sleeve;
   an elongate section of elastic cord having a first end and a second end;
   and a connector configured to connect the first end and second end of said elastic cord to form an endless loop; and
   wherein said kit is configured to be attached to said chain by placing said chain through said central elongate sleeve, routing said elongate section of elastic cord through a first elongate side sleeve, through a link of said chain proximate a first end of said chain, through the second elongate side sleeve, through a link of said chain proximate a second end of said chain, and attaching said first end of said elongate section of elastic cord to said second end of said elongate cord with said connector.

7. The kit for upgrading a chain connection between a tow vehicle and a trailer of claim 6, wherein said kit comprises a second sleeve, a second elongate section of elastic cord, and a second connector.

* * * * *